United States Patent Office 3,558,272
Patented Jan. 26, 1971

3,558,272
TREATMENT OF THIOSULFATE-CONTAINING SOLUTIONS WITH HYDROGEN IN THE PRESENCE OF A NICKEL SULFIDE CATALYST
Peter Urban, Northbrook, Ill., assignor to Universal Oil Products Company, Des Plaines, Ill., a corporation of Delaware
No Drawing. Filed Aug. 15, 1968, Ser. No. 752,792
Int. Cl. C01b *17/06;* C01c *1/20*
U.S. Cl. 23—137                                                12 Claims

ABSTRACT OF THE DISCLOSURE

A water-soluble thiosulfate compound is reduced to elemental sulfur by contacting an aqueous solution of the thiosulfate compound and hydrogen with a solid catalyst comprising nickel sulfide at reduction conditions including a temperature of about 100 to about 300° C. and a pressure of about 100 to about 3000 p.s.i.g. Typically, the elemental sulfur produced by the reduction step is recovered in the form of a polysulfide which can, if desired, be decomposed to separate elemental sulfur.

---

The subject of the present invention is a method for the catalytic conversion of a water-soluble thiosulfate compound to elemental sulfur. More precisely, the present invention relates to a novel catalytic process which utilized controlled amounts of hydrogen in conjunction with a solid nickel sulfide catalyst to remove a water-soluble thiosulfate compound from an aqueous solution thereof. In one aspect, it concerns a method for the production of elemental sulfur, typically recovered as dissolved sulfur in an aqueous sulfide solution (i.e. a polysulfide), from an aqueous solution containing ammonium or an alkali metal thiosulfate. In another aspect, it encompasses treatment of a thiosulfate-containing solution, which generally is a waste stream produced during chemical and/or petroleum processing, in order to remove thiosulfate salts therefrom so that the resulting treated aqueous stream can be conveniently disposed of in sewers and rivers without causing excessive biological oxygen demand problems or so that it can conveniently be reused in the process from which it originated.

As part of the price that has to be paid for a modern industrial society, large quantities of aqueous solutions of thiosulfate compounds are currently produced in a number of industrial processes. In particular, aqueous solutions containing ammonium thiosulfate are an undesired side product of many economically significant industrial processes in the chemical, petroleum and steel industries. For instance, in the petroleum industry, an aqueous solution containing ammonium thiosulfate is produced as a drag stream from sulfur recovery systems that employ an oxidation method to recover sulfur from ammonium hydrosulfide solutions which are available as side streams from such typical refinery processes as hydrorefining, hydrocracking, catalytic cracking, etc. Another source of these thiosulfate containing streams are processes for natural gas sweetening, coal gas purification, town gas purification, and the like processes wherein hydrogen sulfide is scrubbed from a gaseous mixture containing the same, and thereafter oxidized to elemental sulfur in a regeneration step. In these latter types of processes, an inevitable side reaction appears to be one leading to the formation of a thiosulfate salt which can then accumulate in the adsorption solution. The net amount of the thiosulfate being produced must then be continuously or periodically purged from the system by discarding a drag stream. For example, in the Ferrox process for natural gas sweetening or for coal gas purification, where iron oxides suspended in an alkaline, aqueous solution are used to extract $H_2S$ with regeneration of the rich solution by air oxidation, formation of a thiosulfate salt is observed as a side product in the regeneration step, and a drag stream containing this salt must be periodically discarded. Another example is in the Thylox process which is typically utilized for coke-oven gas treating and which employs a treating solution comprising arsenic trioxide and sodium carbonate dissolved in water with regeneration of the rich solution by air oxidation is a separate oxidizing zone. Once again, a drag stream containing thiosulfate salts and water-soluble thiocyanate salts is removed from this process in order to purge the net make of thiosulfate and this stream results in a requirement for continuous replacement of sodium carbonate and arsenic trioxide. Yet another example is the Perox process which utilizes an aqueous ammonium solution containing an organic oxidation catalyst and which regenerates the rich solution by oxidation with air with consequential thiosulfate formation and requirement for thiosulfate-containing drag stream. Regardless of the source of the aqueous stream containing the thiosulfate compound, it is clear that there is a substantial need for a method of treating the thiosulfate solution in order to remove the thiosulfate compound and allow either the reuse of the resulting treated aqueous stream in the process or the safe discharge of the resulting stream in sewers and/or rivers and streams. The first alternative is particularly advantageous when thiosulfate-containing streams also contain other valuable reagents such as in the Thylox process previously mentioned wherein the drag stream also contains sodium carbonate and arsenic trioxide. In addition, the growing sensitivity of the public to the adverse effects of indiscriminate discharge of waste stream by the chemical and petroleum industry provides an additional incentive for treating these thiosulfate-containing streams prior to their discharge into sewer systems.

In a case of particular interest, hydrorefining or hydrocracking of petroleum distillates containing nitrogenous and sulfurous contaminants, large quantities of ammonium and hydrogen sulfide are present in the effluent from the conversion zone, and a portion of these contaminants are generally absorbed in an aqueous solution which is injected into the effluent train of condensers and separating zones associated with the process in order to prevent deposition of ammonium sulfide salts therein. This results in an aqueous waste stream typically containing ammonium hydrosulfide ($NH_4HS$) which can thereafter be subjected to an oxidizing step in order to recover sulfur therefrom or to reduce the biological oxygen demand thereof. Despite stringent precautions a minor amount of thiosulfate salt (i.e. $(NH_4)_2S_2O_3$) appears to be inevitably formed as a side product in this oxidation step. The resulting ammonium thiosulfate-containing aqueous solution withdrawn as effluent from this oxidation step cannot be reused to recover an additional portion of ammonium hydrosulfide because it contains the non-volatile ammonium thiosulfate salt which will clog-up the condensers in the effluent train from the hydrocarbon conversion zone. Moreover, if this thiosulfate-containing stream is injected into the effluent train associated with the hydrorefining or hydrocracking process the hydrogen sulfide and/or ammonium hydrosulfide present in this effluent can react with the ammonium thiosulfate to produce free sulfur which can contaminate the hydrocarbon product from this process leading to severe corrosion problems in downstream equipment. Accordingly, there is a substantial need for a method of treating an aqueous solution containing a thiosulfate compound in order to allow reuse of the aqueous stream within the process which produced it.

The thiosulfate compound present in these aqueous solutions is generally present as a salt of a relatively strong base such as ammonium thiosulfate, and the various alkali metal thiosulfates—for example, sodium thiosulfate, potassium thiosulfate, etc. It is, of course, understood that the thiosulfate compound may be ionized to various degrees in the aqueous solution and indeed the solution typically contains thiosulfate ion. For purposes of the present invention, the preferred thiosulfate compound is ammonium thiosulfate which is typically present in the aqueous solution in an amount sufficient to provide about 0.1 to about 5 wt. percent sulfur as ammonium thiosulfate and more particularly about 1 to about 3 wt. percent sulfur as ammonium thiosulfate. Moreover, excess ammonia is typically present in the solution in an amount of about 1 to about 10 moles of $NH_3$ per mole of $(NH_4)_2S_2O_3$.

Quite understandably in recent years attention within the waste treating arts has been focused upon a search for means of converting these thiosulfate compounds into products that can be easily separated from the aqueous stream thereby allowing a reuse of the resulting aqueous stream in the process from which it came or its discharge into any suitable and available sink such as rivers, lakes, streams, ponds, etc. I have now found a method for converting these water-soluble thiosulfate compounds into elemental sulfur and the corresponding sulfide compounds. Typically, the sulfur and sulfide combine to produce a polysulfide which then can be decomposed to recover elemental sulfur with a minor amount of the corresponding sulfide salt remaining in the treated stream, or if desired, the sulfide salt can be conveniently stripped from the solution, either during the polysulfide decomposition step or in a subsequent stripping step. In many cases, the sulfide side product of the present invention can remain in the treated aqueous stream because a minor amount of this material does not adversely affect the capabilities of the treated aqueous stream when it is recycled.

At this point it is to be noted that the phrase "elemental sulfur" is used herein not only to designate elemental sulfur per se but also to include the polysulfide product formed by dissolving the elemental sulfur in the corresponding sulfide solution.

It is, accordingly, an object of my invention to provide a method for the removal of a thiosulfate compound from an aqueous solution containing the same. Another object is to provide a method for purifying thiosulfate-containing waste streams so that they may be reused if desired. Still another objective is to provide a method for producing sulfur from a solution of water-soluble thiosulfate compound. Yet another objective is to control a source of water pollution by chemical, petroleum, steel and the like industries by providing a convenient treatment procedure which allows the reuse of the water contained in aqueous waste streams containing thiosulfate compounds.

In one embodiment, my invention comprises a method for reducing a water-soluble thiosulfate compound to sulfur. The method involves contacting an aqueous solution of the thiosulfate compound and hydrogen with a solid catalyst comprising nickel sulfide at reduction conditions including a temperature of about 50 to about 300° C. and a pressure of about 100 to about 3000 p.s.i.g.

In a second embodiment, my invention is a method for removing ammonium thiosulfate from an aqueous solution thereof by contacting the aqueous solution and hydrogen with a solid catalyst comprising nickel sulfide at reduction conditions including a temperature of about 160 to about 225° C. and a pressure of about 100 to about 3000 p.s.i.g.

In a third embodiment, the invention is a method for producing sulfur from a water-soluble thiosulfate compound which method comprises a reduction step followed by a decomposition step. The reduction step involves contacting an aqueous solution of said thiosulfate compound and hydrogen with a catalyst comprising nickel sulfide at reduction conditions selected to produce a polysulfide compound. The decomposition step involves subjecting the resulting polysulfide compound to decomposition conditions which results in a separation of elemental sulfur from the corresponding sulfide compound.

In a preferred embodiment, my invention involves a method for producing sulfur from ammonium thiosulfate by a method comprising a reduction step and a decomposition step. The reduction step involves contacting an aqueous solution of ammonium thiosulfate and hydrogen with a catalyst comprising nickel sulfide combined with a carrier material selected from the group consisting of alumina, activated carbon, and activated charcoal at reduction conditions, including a temperature of about 160° C. to about 225° C., a pressure of about 100 to 3000 p.s.i.g., and a $H_2/(NH_4)_2S_2O_3$ ratio of about 2 to about 3.4 selected to produce a polysulfide compound. The decomposition step includes subjecting the resulting polysulfide compound to thermal decomposition conditions resulting in the precipitation of elemental sulfur.

Other embodiments and objects of the present invention encompass details about particular thiosulfate-containing solutions, preferred catalytic compositions, preferred process conditions, and particularly useful flow schemes, all of which are hereinafter disclosed in the following discussion of each of these facets of the present invention.

One feature of the present invention is the utilization of a solid nickel sulfide catalyst. As indicated hereinbefore, I have determined that the nickel sulfide catalyst has exceptionally high activity for the conversion of thiosulfate compounds coupled with an unexcepted relatively high selectivity for sulfur. These characteristics of this nickel sulfide catalyst render its use particularly beneficial since it yields a commercially valuable product, sulfur. In addition, the high activity of the nickel sulfide catalyst for this reduction enables the reaction to be conducted at conditions which are of relatively low severity, thereby effecting savings in utilities associated with the process such as cost of heat generation, $H_2$ compressor capacity, etc.

In some cases, a slurry of the nickel sulfide particles can be utilized in a moving bed-type system to catalyze the desired reduction reaction. However, I have found best results which the nickel sulfide is combined with a suitable carrier material and utilized in a fixed bed-type system. Examples of suitable carrier materials are charcoals, such as wood charcoal, bone charcoal, etc. which charcoals may be activated prior to use; refractory inorganic oxides such as alumina, silica, zirconia, bauxite, etc.; activated carbons such as those commercially available under trade names of Norite, Nuchar, Darco, and other similar carbon materials familiar to those skilled in the art. In addition, other natural or synthetic highly porus inorganic carrier materials such as various forms of clay, kieselguhr, etc. mya be used if desired. The preferred carrier materials are alumina, particularly gamma-alumina, and activated carbon or charcoal. Thus, nickel sulfide combined with alumina or activated charcoal or activated carbon are particularly preferred catalysts for the method of the present invention.

The preferred method for combining the nickel sulfide with the carrier material is by impregnating the carrier material with an aqueous solution of a soluble salt of nickel such as nickel bromide, nickel perchlorate, nickel chloride, nickel acetate, nickel nitrate, nickel sulfate, etc. The nickel component of the resulting composite can then be converted to the sulfide by treatment with hydrogen sulfide preferably at room temperature. The resulting sulfided composite is thereafter washed with an aqueous and/or ammoniacal solution and dried. In some cases, it may be advantageous to calcine the impregnated carrier material to obtain a distribution of nickel sulfide on the carrier material which can thereafter be sulfided with a suitable sulfur compounds, preferably hydrogen sulfide, at high temperatures (i.e. 400 to 700° C.) in order to obtain the desired catalyst.

In general, the nickel sulfide is preferably composited with the carrier material in an amount sufficient to result in a final composite containing about 0.1 to about 25 wt. percent nickel, calculated as the elemental metal. However, it is generally preferred to operate in the range of about 1 to about 15 wt. percent nickel. Accordingly, examples of particularly preferred catalytic composites for use in the present invention comprise: about 1 to about 15 wt. percent nickel as nickel sulfide on an activated carbon or charcoal or alumina support.

An essential reactant for the method of the present invention is hydrogen. This may be utilized in any suitable form, either by itself or mixed with other relatively inert gases such as a mixture of hydrogen with $C_1$ to $C_4$ hydrocarbons, a mixture of hydrogen and nitrogen, a mixture of hydrogen and carbon dioxide, a mixture of hydrogen and hydrogen sulfide, etc. The excess recycle gas obtained from various petroleum processes that have a net hydrogen make such as a reforming process, a dehydrogenation process, etc. may also be used if desired. It is desirable that the hydrogen be utilized in an amount equivalent to or greater than the stoichiometric amount required for the reduction of thiosulfate to sulfur. The stoichiometric amount is 2 moles of hydrogen per mole of thiosulfate. In general, it is preferred to operate at a hydrogen to thiosulfate mole ratio which is relatively close to the stoichiometric amount—preferably about 1.0 about 1.7 times the stoichiometric amount. Hence, above 2 to about 3.4 moles of hydrogen per mole of the thiosulfate compound is preferably used, although amounts up to 50 moles per mole of thiosulfate can be utilized if desired. It is understood that the unreacted hydrogen recovered from the effluent of the reduction step of the present invention can be recycled, if desired, through suitable compressive means to supply at least a portion of the hydrogen for this reaction.

The process of the present invention can be carried out in any suitable manner, in either a batch or continuous type system. A particularly preferred method involves a fixed bed catalyst system in which the catalyst is disposed in a reduction zone. According to the present invention, the thiosulfate-containing aqueous solution is then passed therethrough in either upward, radial or downward flow with hydrogen being simultaneously introduced therein in either countercurrent or concurrent flow relative to the thiosulfate solution. In particular, a preferred embodiment involves downflow of both the thiosulfate solution and hydrogen through the reduction zone.

In general, the effluent stream withdrawn from the reduction zone contains the sulfur product of the reduction reaction in the form of a polysulfide compound and also contains a minor amount of unreacted thiosulfate, hydrogen and water. The polysulfide is formed as a consequence of a reaction between a minor amount of sulfide produced in the reduction step and the elemental sulfur. The hydrogen is typically separated from this aqueous effluent stream in a separating zone and recycled to the reduction zone. If desired, the polysulfide compound may be decomposed within the reduction zone by operating the reduction zone at a temperature and pressure sufficient to decompose the resulting polysulfide compound or to prevent its formation with recovery of a slurry of molten sulfur and water from the bottom of the reduction zone. However, the preferred procedure involves subjecting the polysulfide-containing aqueous stream to a separate decomposition step designed to decompose the polysulfide.

In general, the decomposition step can be conducted according to any of the methods taught in the prior art for decomposing a polysulfide compound. For example, one textbook procedure involves the addition of a strong mineral acid such as sulfuric acid or hydrogen chloride to the polysulfide-containing aqueous stream in an amount sufficient to liberate elemental sulfur, typically with resulting evolution of hydrogen sulfide gas. However, in view of the danger of forming substantial amounts of non-volatile salts from this reaction, the preferred procedure involves the thermal decomposition of the polysulfide-containing solution. Generally, this last procedure involves the charging of the effluent stream from the reduction zone, after hydrogen separation, to a conventional distillization zone wherein the bottoms temperature is maintained in a range of about 100° C. to about 150° C. and a vapor phase is taken as overhead from this zone at a sufficient rate to maintain the desired temperature at the bottom of the zone. Accordingly, the polysulfide-containing aqueous stream is subjected to a temperature of about 100 to about 150° C. to produce an overhead stream containing ammonia, hydrogen sulfide, and steam, and to precipitate sulfur which collects at the bottom of the distillation zone in liquid form and is drawn off as a separate bottoms product or as a slurry of sulfur in water. The details associated with the design of a suitable distillation means to decompose the polysulfide in this solution are well known to those skilled in the art and will not be repeated here.

Regardless of the method by which the polysulfide is decomposed, an aqueous effluent stream is recovered from the decomposition step and is found to be substantially reduced in thiosulfate salt content. In addition, this stream contains only minor amounts of sulfide salts and may be discharged in any suitable manner without causing any significant waste disposal problems since it has a relatively minor biological oxygen demand and does not contain any substantial amounts of nutrients that lead to excessive growth of stream vegetation. In many cases, this treated aqueous stream from the decomposition zone can be directly reused in the process from which the thiosulfate-containing aqueous solution was originally withdrawn.

In another embodiment of the present invention, the thiosulfate-containing aqueous stream is passed downflow into the reduction zone containing the nickel sulfide catalyst and the hydrogen stream is passed upflow through this zone. This counter-current operation produces an overhead stream containing hydrogen, ammonia, and hydrogen sulfide and a bottoms aqueous stream is substantially free of both thiosulfate and sulfide salts. Moreover, in some cases, depending upon the temperature utilized in the reduction zone the aqueous bottom stream withdrawn from the reduction zone may contain a slurry of elemental sulfur. In this last case, the elemental sulfur can be separated from the aqueous stream by any of the means taught in the art for separating a solid from a liquid such as by filtering, settling, or centrifuging, etc. On the other hand, if the temperature in the reduction zone is maintained at a sufficiently high level so that the sulfur is formed in a liquid or molten state the sulfur may be removed simply by drawing off a separate bottoms phase from the reduction zone.

In some situations, it may be advantageous to operate the present invention in a multi-stage manner in order to effect complete conversion of thiosulfate to sulfur. The techniques for performing a multi-stage reduction operation are well-known to those skilled in the art and will not be repeated here.

The conditions utilized in the reduction step of the present invention are generally described as a reduction condition effecting conversion of thiosulfate to sulfur. The temperature utilized is preferably selected from the range of about 50 to about 300° C., with best results obtained at approximately 160 to about 225° C. The pressure employed is typically a pressure which is sufficient to maintain the thiosulfate solution in liquid phase. In general, it is preferred to operate at superatmospheric pressures and pressures of about 100 to about 3000 p.s.i.g. are particularly preferred.

In the embodiment of the present invention wherein the process is operated in a batch type operation, the contact time utilized in the reduction step is preferably from about ½ to about 5 hours with best results obtained with a contact time of about 1 to about 2½ hours. In a continuous process it is preferred to use in the reduction step, a liquid hourly space velocity (defined on the basis of the volume charge rate of thiosulfate solution divided by the total volume of catalyst within the reduction zone) ranging from about 0.5 to about 5.0 hr.$^{-1}$, with best results obtained at about 1.0 to about 3.0 hr.$^{-1}$.

The following examples are given to illustrate further the novelty, preferred modes of operation, and utility of the present invention. It is not intended to limit unduly the present invention to the specific process conditions, feed compositions, and catalyst compositions employed therein, since these are intended to be illustrative rather than restrictive.

EXAMPLE I

This example demonstrates the present invention in a batch embodiment with a catalyst comprising nickel sulfide combined with alumina.

A gamma-alumina carrier material is manufactured in accordance with the method described in U.S. Pat. No. 2,620,314 by passing droplets of an alumina hydrosol into an oil bath by means of a nozzle or rotating disk. After specific aging, drying and calcining treatments as specified in this patent, the carrier material is recovered in the form of ⅛ inch gamma-alumina spheres. The resulting spheres are then impregnated with a solution of nickel nitrate in an amount sufficient to result in a final composite containing 12.9 wt. percent nickel. After drying, the impregnated carrier material is heated for about 2 hours in a stream of air at a temperature of about 800° F. in order to decompose the nitrate. Subsequently, the resultant composite is sulfided by passing a stream of $H_2S$ over it at room temperature.

The resulting catalyst in an amount of 27 grams is then placed in a batch type reaction zone. A solution of ammonium thiosulfate is then prepared by dissolving 10 grams of $(NH_4)_2S_2O_3$ in 250 cc. of water to produce a solution containing 0.68 mole of $(NH_4)_2S_2O_3$. The resulting solution is then added to the reaction zone. The reaction zone is thereafter sealed off and pressurized with substantially pure hydrogen gas to a pressure of about 1500 p.s.i.g. The amount of hydrogen present in the reaction zone is equivalent to about 10 moles of hydrogen per mole of thiosulfate. The temperature of the reaction zone is then raised to 200° C. and is maintained at this level for 1 hour. At the end of this time the liquid phase from the reaction zone is analyzed and it is found that substantial conversion of thiosulfate to sulfur has occurred.

EXAMPLE II

This example indicates the benefits of the present invention in a batch type operation with a slurry of nickel sulfide. In an experiment similar to that reported in Example I, 10 grams of a slurry of nickel sulfide particles, in a size of about 100 to 200 mesh, is added to the reaction zone. The composition of the thiosulfate solution and the conditions utilized in the reaction zone are identical to those reported in Example I. At the end of the experiment, an analysis of the liquid product withdrawn from the reaction zone reveals substantial conversion of the thiosulfate to elemental sulfur.

EXAMPLE III

This example demonstrates the present invention in a continuous process in which the catalyst is utilized as a fixed bed in a reaction zone with a thiosulfate-containing solution, being continuously fed into the reaction zone and an effluent stream containing ammonium polysulfide beig continuously withdrawn from the reaction zone.

A commercially available charcoal (known as Darco charcoal) in a 12–20 mesh size is impregnated with a solution of nickel acetate in an amount sufficient to result in a final catalyst containing about 5 wt. percent nickel on an elemental basis. The catalyst is then sulfided with hydrogen sulfide at room temperature in an amount sufficient to convert the nickel to nickel sulfide. Thereafter, the catalyst was washed with water and an ammoniacal aqueous solution.

The resulting catalyst in an amount of 99 cc. is then placed in a reaction zone and supported therein as a fixed bed. A thiosulfate-containing feed stream is then prepared by dissolving $(NH_4)_2S_2O_3$ in an ammoniacal aqueous solution in a mole ratio of about 4 moles of $NH_4OH$ per mole of $(NH_4)_2S_2O_3$. The resulting aqueous, ammoniacal solution contained 2 wt. percent sulfur as $(NH_4)_2S_2O_3$.

A hydrogen stream is commingled with the thiosulfate-containing aqueous stream in an amount of about 3.0 moles of $H_2$ per mole of thiosulfate, and the resulting mixture heated to a conversion temperature of about 200° C. The resulting heated mixture is then passed downflow into the reaction zone containing the catalyst at a pressure of 1000 p.s.i.g. and a LHSV based on the aqueous stream of 2.0 hr.$^{-1}$. An effluent stream is withdrawn from the bottom of the reaction zone and passed to a separating zone wherein a hydrogen-containing gaseous phase separates from a liquid aqueous phase.

The hydrogen-containing gaseous phase is withdrawn from the separating zone, recompressed, and recycled to the reaction zone. The liquid aqueous phase is withdrawn from the separating zone and passed to a distillation zone wherein a bottoms temperature of about 125° C. is maintained by control of the pressure at the top of the zone. In the distillation zone ammonium polysulfide is decomposed with production of an overhead stream containing $NH_3$, $H_2S$, and $H_2O$ and of a bottoms stream containing a slurry of elemental sulfur and water. The bottom stream is then passed to a sulfur settler where a liquid sulfur phase separates from a water phase. The water phase is withdrawn and found to contain only a minor amount of ammonium thiosulfate.

I claim as my invention:

1. A method for reducing a water-soluble inorganic thiosulfate compound to a polysulfide compound which comprises contacting an aqueous solution of said thiosulfate compound and hydrogen with a solid catalyst comprising nickel sulfide at a temperature of about 50 to about 300° C. and a pressure of about 100 to about 3000 p.s.i.g.

2. The method of claim 1 wherein said thiosulfate compound is ammonium thiosulfate.

3. The method of claim 1 wherein said thiosulfate compound is an alkali metal thiosulfate.

4. The method of claim 2 wherein said hydrogen is present in an amount of about 2 to about 3.4 moles per mole of said thiosulfate compound.

5. A method for producing sulfur from a water-soluble inorganic thiosulfate compound, said method comprising the steps of: contacting an aqueous solution of said thiosulfate compound and hydrogen with a catalyst comprising nickel sulfide at a temperature of about 50 to about 300° C. and a pressure of about 100 to about 3000 p.s.i.g. to produce a polysulfide compound and decomposing the resulting polysulfide compound to recover sulfur.

6. The method of claim 5 wherein said thiosulfate compound is ammonium thiosulfate.

7. The method of claim 6 wherein said catalyst comprises nickel sulfide combined with a carrier material.

8. The method of claim 7 wherein said carrier material is alumina.

9. The method of claim 7 wherein said carrier material is activated carbon or activated charcoal.

10. The method of claim 9 wherein said reduction conditions include a temperature of about 160° C. to about 225° C., and a pressure of about 100 to 3000 p.s.i.g.

11. The method of claim 10 wherein said hydrogen is present in an amount of about 2 to about 3.4 moles per mole of said thiosulfate compound.

12. The method of claim 11 wherein the decomposing step comprises heating the solution containing polysulfide compound to a temperature of about 100 to about 150° C. and stripping ammonia, hydrogen sulfide, and a minor amount of water from said heated solution to form liquid sulfur.

References Cited
UNITED STATES PATENTS

| | | | |
|---|---|---|---|
| 1,636,106 | 7/1927 | Naef | 23—137 |
| 1,783,725 | 12/1930 | Langheinrich | 23—229 |
| 2,414,042 | 1/1947 | Highhill | 23—137 |
| 2,722,473 | 11/1955 | Toland, Jr. | 23—224 X |
| 3,457,046 | 7/1969 | Hoekstra | 23—224 |

FOREIGN PATENTS

| | | | |
|---|---|---|---|
| 27,477 | 1910 | Great Britain | 23—137 |
| 336,251 | 1930 | Great Britain | 23—137 |

OSCAR R. VERTIZ, Primary Examiner

G. O. PETERS, Assistant Examiner

U.S. Cl. X.R.

23—224